United States Patent
Hofmann et al.

(10) Patent No.: US 8,107,492 B2
(45) Date of Patent: Jan. 31, 2012

(54) COOPERATIVE WRITES OVER THE ADDRESS CHANNEL OF A BUS

(75) Inventors: Richard Gerard Hofmann, Cary, NC (US); Terence J. Lohman, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 624 days.

(21) Appl. No.: 11/468,908

(22) Filed: Aug. 31, 2006

(65) Prior Publication Data

US 2007/0201506 A1 Aug. 30, 2007

Related U.S. Application Data

(60) Provisional application No. 60/776,529, filed on Feb. 24, 2006.

(51) Int. Cl.
*H04J 3/00* (2006.01)
(52) U.S. Cl. ........ 370/464; 370/431; 370/437; 370/465; 710/20; 710/21; 710/36; 710/40; 710/71; 711/151; 711/158
(58) Field of Classification Search .................. 370/351, 370/357, 360–385, 431, 438–440, 458–461, 370/464, 498–545; 711/151, 158; 710/20, 710/21, 36, 40, 71
See application file for complete search history.

(56) References Cited

U.S. PATENT DOCUMENTS

| | | | |
|---|---|---|---|
| 4,747,101 A * | 5/1988 | Akaiwa et al. ................ 370/329 |
| 5,255,376 A | 10/1993 | Frank | |
| 5,612,742 A | 3/1997 | Krause et al. | |
| 5,745,707 A * | 4/1998 | Takahashi ................ 710/110 |
| 5,936,956 A * | 8/1999 | Naven ................ 370/395.7 |
| 6,151,262 A | 11/2000 | Haroun et al. | |
| 6,163,835 A | 12/2000 | Todd et al. | |
| 6,292,873 B1 | 9/2001 | Keaveny et al. | |
| 6,434,638 B1 * | 8/2002 | Deshpande ................ 710/39 |
| 6,868,464 B2 | 3/2005 | Levy | |
| 7,392,353 B2 * | 6/2008 | Barrett et al. ............ 711/151 |

(Continued)

FOREIGN PATENT DOCUMENTS

GB 2362735 11/2001

(Continued)

OTHER PUBLICATIONS

Transmission Control Protocol, Feb. 14, 2005, http://web.archive.org/web/20050214112558/http://tcp.mywebcities.com/.*

(Continued)

*Primary Examiner* — Hassan Kozou
*Assistant Examiner* — Ashil Farahmand
(74) *Attorney, Agent, or Firm* — Peter M. Kamarchik; Nicholas J. Pauley; Jonathan T. Velasco

(57) ABSTRACT

A processing system and method for communicating in a processing system over a bus is disclosed. The processing system includes a receiving device, a bus having first, second and third channels, and a sending device configured to address the receiving device on the first channel, and read a payload from the receiving device on the second channel, the sending device being further configured to write a first portion of a payload to the receiving device on the first channel and a second portion of the payload to the receiving device on the third channel.

35 Claims, 7 Drawing Sheets

U.S. PATENT DOCUMENTS

| | | |
|---|---|---|
| 2005/0071533 A1 | 3/2005 | Adams et al. |
| 2005/0165995 A1* | 7/2005 | Gemelli et al. ............... 710/305 |
| 2005/0172063 A1* | 8/2005 | Hofmann et al. ............. 710/306 |
| 2005/0223158 A1 | 10/2005 | See et al. |
| 2005/0273537 A1* | 12/2005 | Harris et al. ................. 710/110 |

FOREIGN PATENT DOCUMENTS

| | | |
|---|---|---|
| JP | 62231365 A | 10/1987 |
| JP | 2012358 A | 1/1990 |
| JP | 2025958 A | 1/1990 |
| JP | 9507325 T | 7/1997 |
| JP | 2000115208 A | 4/2000 |
| JP | 2000215183 A | 8/2000 |
| JP | 2003050742 A | 2/2003 |
| JP | 2007520832 A | 7/2007 |
| RU | 2154346 C2 | 8/2000 |
| SU | 1550524 A1 | 3/1990 |
| SU | 1807493 A1 | 4/1993 |
| WO | WO2005078594 | 8/2005 |

OTHER PUBLICATIONS

International Search Report—PCT/US07/062761, International Search Authority—European Patent Office—Jul. 5, 2007.

Written Opinion, PCT/US07/062761, International Searching Authority, European Patent Office, Jul. 5, 2007.

International Preliminary Report on Patentability, PCT/US07/062761, The International Bureau of WIPO, Geneva, Switzerland, Aug. 26, 2008.

* cited by examiner

COOPERATIVE WRITES OVER THE ADDRESS CHANNEL OF A BUS

RELATED APPLICATIONS

The present Application for Patent claims priority to Provisional Application No. 60/776,529 entitled "Cooperative Writes Over Address Channel" filed Feb. 24, 2006, and assigned to the assignee hereof and hereby expressly incorporated by reference herein.

The present Application for Patent is related to the following co-pending U.S. Patent Applications:

"Auxiliary Writes Over Address Channel" having Ser. No. 11/468,933, filed concurrently herewith, assigned to the assignee hereof, and expressly incorporated by reference herein.

BACKGROUND

1. Field

The present disclosure relates generally to processing systems, and more specifically, to systems and techniques for performing cooperative writes over the address channel of a bus.

2. Background

At the heart of most modern processing systems is an interconnect referred to as a bus. The bus moves information between various processing entities in the system. Today, most bus architectures are fairly standardized. These standardized bus architectures typically have independent and separate read, write and address channels.

This type of bus architecture is often found in processing systems with one or more general purpose processors supported by memory. In these systems, the memory provides a storage medium that holds the programs and data needed by the processors to perform their functions. A processor may read or write to the memory by placing an address on the address channel and sending the appropriate read/write control signal. Depending on the state of the read/write control, the processor either writes to the memory over the write channel or reads from the memory over the read channel. In these types of processing systems, as well as many others, it is desirable to reduce the write latency and increase the write bandwidth.

SUMMARY

An aspect of a processing system is disclosed. The processing system includes a receiving device, a bus having first, second and third channels, and a sending device configured to address the receiving device on the first channel, and read a payload from the receiving device on the second channel, the sending device being further configured to write a first portion of a payload to the receiving device on the first channel and a second portion of the payload to the receiving device on the third channel.

Another aspect of a processing system is disclosed. The processing system includes a receiving device, a bus having first, second and third channels, means for addressing the receiving device on the first channel, means for reading a payload from the receiving device on the second channel, and means for writing a first portion of a payload to the receiving device on the first channel and a second portion of the payload to the receiving device on the third channel.

An aspect of a method of communicating between a sending device and a receiving device over a bus is disclosed. The bus includes first, second and third channels. The method includes addressing a receiving device on the first channel, reading a payload from the receiving device on the second channel, and writing a first portion of a payload to the receiving device on the first channel and a second portion of the payload to the receiving device on the third channel.

An aspect of a bus mastering device is disclosed. The bus mastering device includes a processor, and a bus interface configured to interface the processor to a bus having first, second and third channels, the bus interface being further configured to address a slave on the first channel, receive a payload from the slave on the second channel, and write a first portion of a payload to the slave on the first channel and a second portion of the payload to the slave on the third channel.

Another aspect of a bus mastering device is disclosed. The bus mastering device includes a processor, and means for interfacing the processor to a bus having first, second and third channels, the means for interfacing the processor to the bus comprising means for addressing a slave on the first channel, means for receiving a payload from the slave on the second channel, and means for writing a first portion of a payload to the slave on the first channel and a second portion of the payload to the slave on the third channel.

An aspect of a slave device is disclosed. The slave device includes memory, and a bus interface configured to interface the memory to a bus having first, second and third channels, the bus interface being configured to receive an address and a first portion of a payload from a bus mastering device on the first channel, send a payload to the bus mastering device on the second channel, and receive a second portion of the payload from the bus mastering device on the third channel.

Another aspect of a slave device is disclosed. The slave device includes memory, and means for interfacing the memory to a bus having first, second and third channels, the means for interfacing the memory to the bus comprising means for receiving an address and a first portion of a payload from a bus mastering device on the first channel, means for sending a payload to the bus mastering device on the second channel, and means for receiving a second portion of the payload from the bus mastering device on the third channel.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
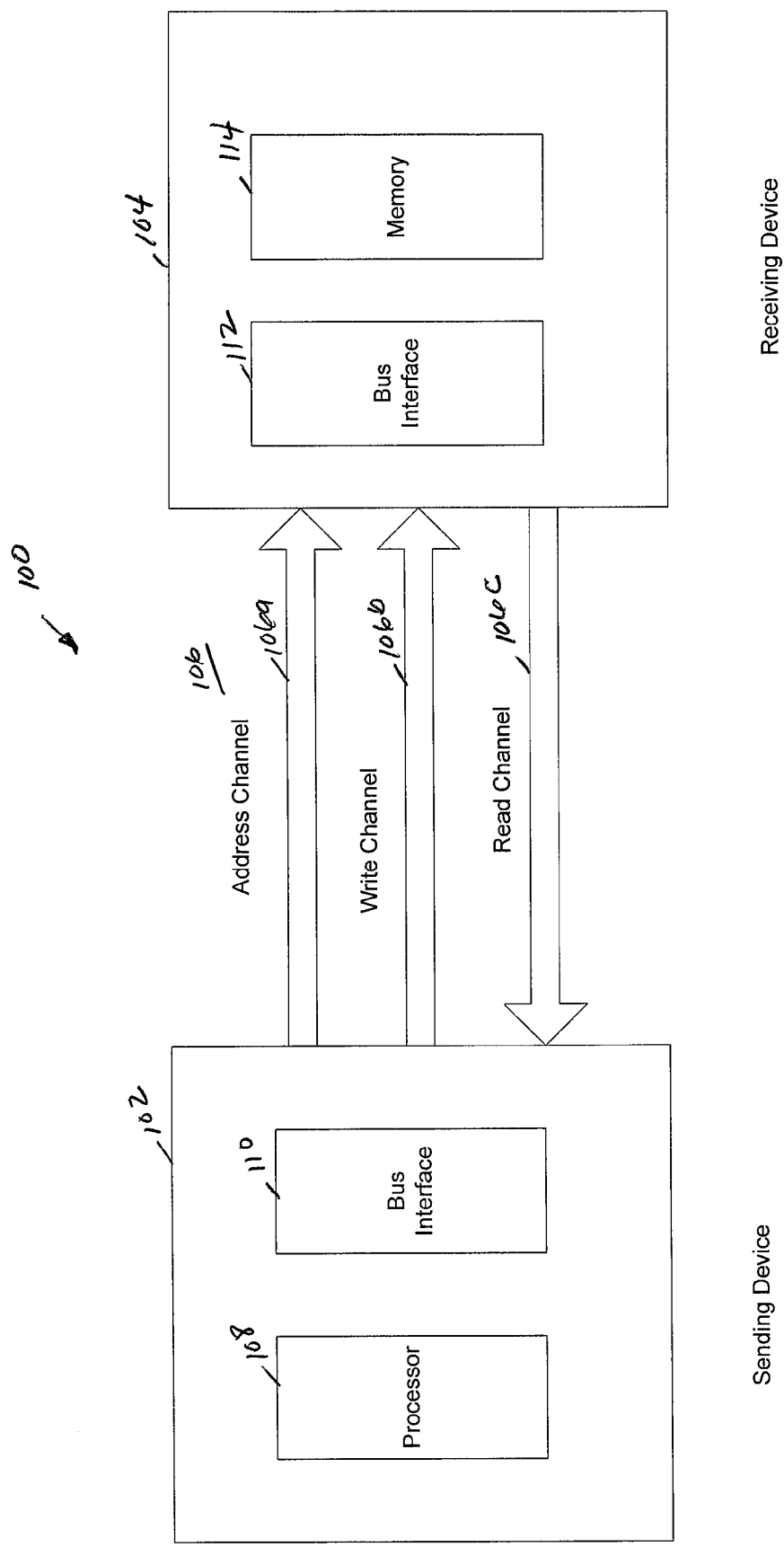
FIG. 1 is a simplified block diagram illustrating an example of two devices in a processing system communicating over a bus.

FIG. 1 is a simplified block diagram illustrating an example of two devices in a processing system communicating over a bus. The processing system 100 may be a collection of hardware devices that cooperate to perform one or more processing functions. Typical applications of the processing system 100 include, but are not limited to, desktop computers, laptop computers, servers, cellular phones, personal digital assistants (PDA), game consoles, pagers, modems, audio equipment, medical devices, automotive, video equipment, industrial equipment, or any other machine or device capable of processing, retrieving and storing information.

The processing system 100 is shown with a sending device 102 in communication with a receiving device 104 over a bus 106. The bus 106 includes three channels: an address channel 106a, a write channel 106b, and a read channel 106c. A "channel" is defined as a set of electrical conductors used to carry information between two devices and which has a set of common control signals. In this example, each channel is 32-bits wide. Typically, a bus interconnect (not shown) will be used to establish a point-to-point communications path between the sending device 102 and the receiving device 104 over the bus 106. Alternatively, the bus 106 may be a dedicated bus, a shared bus, or any other type of suitable bus architecture.

The sending device 102 may be any type of bus mastering device. In this example, the sending device 102 includes a processor 108 and a bus interface 110. The processor 108 may be a general purpose processor, such as a microprocessor, a special purpose processor, such as a digital signal processor (DSP), an application specific integrated circuit (ASIC), a direct memory access (DMA) controller, a bridge, a programmable logic component, or any other entity that requires access to the bus 106. The bus interface 110 is used to drive the address and write channels 106a, 106b, as well as provide the appropriate control signals. The bus interface 110 also serves as a receiver for the read channel 106c.

The receiving device 104 may be any type of slave device. The receiving device 104 may be temporary memory, such as SDRAM, DRAM, or RAM, or a longer term storage device such as flash memory, ROM memory, EPROM memory, EEPROM memory, CD-ROM, DVD, magnetic disk, rewritable optic disk, etc. Alternatively, the receiving device 104 may be a bridge or any other device capable of retrieving and storing information. In this example, the receiving device 104 includes a bus interface 112 and memory 114. The bus interface 112 is used to drive the read channel 106c and the appropriate control signals. The bus interface 112 also serves as a receiver for the address and write channels 106a, 106b. The memory 114 may be any device whose contents can be accessed (i.e., read and written to) randomly.

In this bus architecture, the sending device 102 may read from or write to the receiving device 104. When the sending device 102 performs a write operation, it sends the address to the receiving device 104 on the address channel 106a with the appropriate control signals. The payload may be sent either on the address channel 106a, the write channel 106b, or both. The "payload" refers to the data associated with a particular read or write operation, and in this case, a write operation. When the sending device performs a read operation, it sends the address to the receiving device 104 on the address channel 106a with the appropriate control signals. In response, the receiving device 104 sends the payload to the sending device 102 on the read channel 106c.

Figure 2:
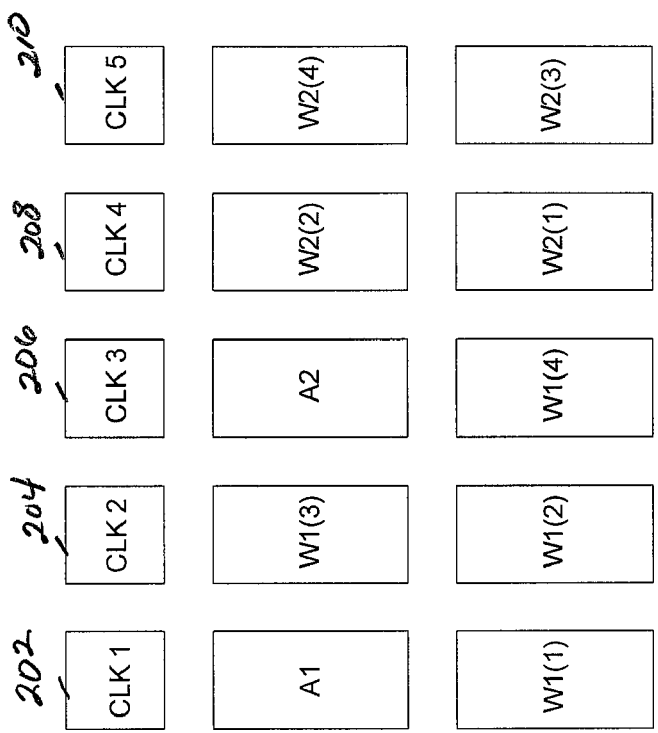
FIG. 2 is an illustration showing information flowing on the address and write channels of a bus in the processing system of FIG. 1 with the address channel providing a generic medium for addresses and data.

An example of two write operations will now be described with reference to FIG. 2. FIG. 2 is an illustration showing the information flowing on the address and write channels. In this example, the sending device initiates two 16-byte write operations.

Referring to FIG. 2, on the first clock cycle 202, the sending device initiates the first 16-byte write operation by sending a 4-byte address A1 to the receiving device on the address channel 106a with the appropriate control signals. During the same clock cycle 202, the sending device also sends the first 4-bytes of the first payload W1(1) to the receiving device on the write channel 106b.

On the second clock cycle 204, the sending device uses both the address channel 106a and the write channel 106b to send data. The sending device sends the second 4-bytes of the first payload W1(2) on the write channel 106b and third 4-bytes of the first payload W1(3) on the address channel 106a The sending device initiates the next 16-byte write operation during the third clock cycle 206 by sending a 4-byte address A2 to the receiving device on the address channel 106a with the appropriate control signals. The sending device completes the transmission of the first payload during the same clock cycle of the next write operation by sending the final 4-bytes W1(4) to the receiving device on the write channel 106b.

The sending device then uses the next two clock cycles to send the second payload to the receiving device. On the fourth clock cycle 208, the sending device sends to the receiving device the first 4-bytes of the second payload W2(1) on the write channel 106b and the second 4-bytes of the second payload W2(2) on the address channel 106a. On the next clock cycle 210, the sending device sends to the receiving device the third 4-bytes of the second payload W2(3) on the write channel 106b and the final 4-bytes of the second payload W2(4) on the address channel 106a.

Two types of control signals may be used to support a medium for the transmission of addresses and data. The first control signal, referred to as an "Address/Data" signal, is used on the address channel 106a to indicate whether the information being transmitted is an address or data. In this example, when the Address/Data signal is asserted, an address is being transmitted on the address channel 106a. Conversely, when the Address/Data signal is deasserted, data is being transmitted on the address channel 106a.

The second control signal, referred to as a "Beat ID," is used on both the address and write channels 106a, 106b to indicate the beat of the current payload being transmitted. It should be noted that the "Beat ID" is a zero-based indicator such that a value of "0" indicates the first beat of the payload being transmitted. In this example, each payload is transmitted in its entirety before the next payload is transmitted, and therefore, there is no need for signaling to identify each payload. In alternative embodiments of the processing system, where the payloads are transmitted out of order, or the beats of different payloads are interleaved, the signaling may include payload sequence numbers.

An example illustrating how the two control signals may be used will now be described with reference to FIG. 3. The bus protocol for the address and write channels 106a, 106b is shown below in Table 1. This bus protocol is being used to illustrate the inventive aspects of a processing system, with the understanding that such inventive aspects may be used with other bus protocols. Those skilled in the art will readily be able to vary and/or add signals to this protocol in the actual implementation of the bus architectures described herein.

TABLE 1

| Signal | Definition | Driven By |
|---|---|---|
| Address Channel | | |
| Address | 32-bit medium to transmit addresses and data. | Sending Device |
| Address/Data | Indicates whether the information being transmitted on the address channel is an address or data. | Sending Device |
| AValid | Indicates whether valid information is being transmitted on the address channel. | Sending Device |
| Address Beat ID | Indicates which beat of the payload is being transmitted on the address channel during a data tenure. | Sending Device |
| Read/Write | Indicates whether a read or write operation is being requested during an address tenure. | Sending Device |
| Payload Size | Indicates the size of the payload for the current address. | Sending Device |
| Address Transfer Ack | Indicates whether the receiving device has successfully received information transmitted on the address channel. | Receiving Device |
| Write Channel | | |
| Write | 32-bit medium to transmit data. | Sending Device |
| WValid | Indicates whether valid information is being transmitted on the write channel. | Sending Device |
| Write Beat ID | Indicates which beat of the payload is being transmitted on the write channel. | |

TABLE 1-continued

| Signal | Definition | Driven By |
|---|---|---|
| Write Transfer Ack | Indicates whether the receiving device has successfully received information transmitted on the write channel. | Receiving Device |

TABLE 2

| Beat ID | Definition |
|---|---|
| 00 | Indicates that the first beat of the payload is being transmitted on the channel. |
| 01 | Indicates that the second beat of the payload is being transmitted on the channel. |
| 10 | Indicates that the third beat of the payload is being transmitted on the channel. |
| 11 | Indicates that the fourth beat of the payload is being transmitted on the channel. |

Figure 3:
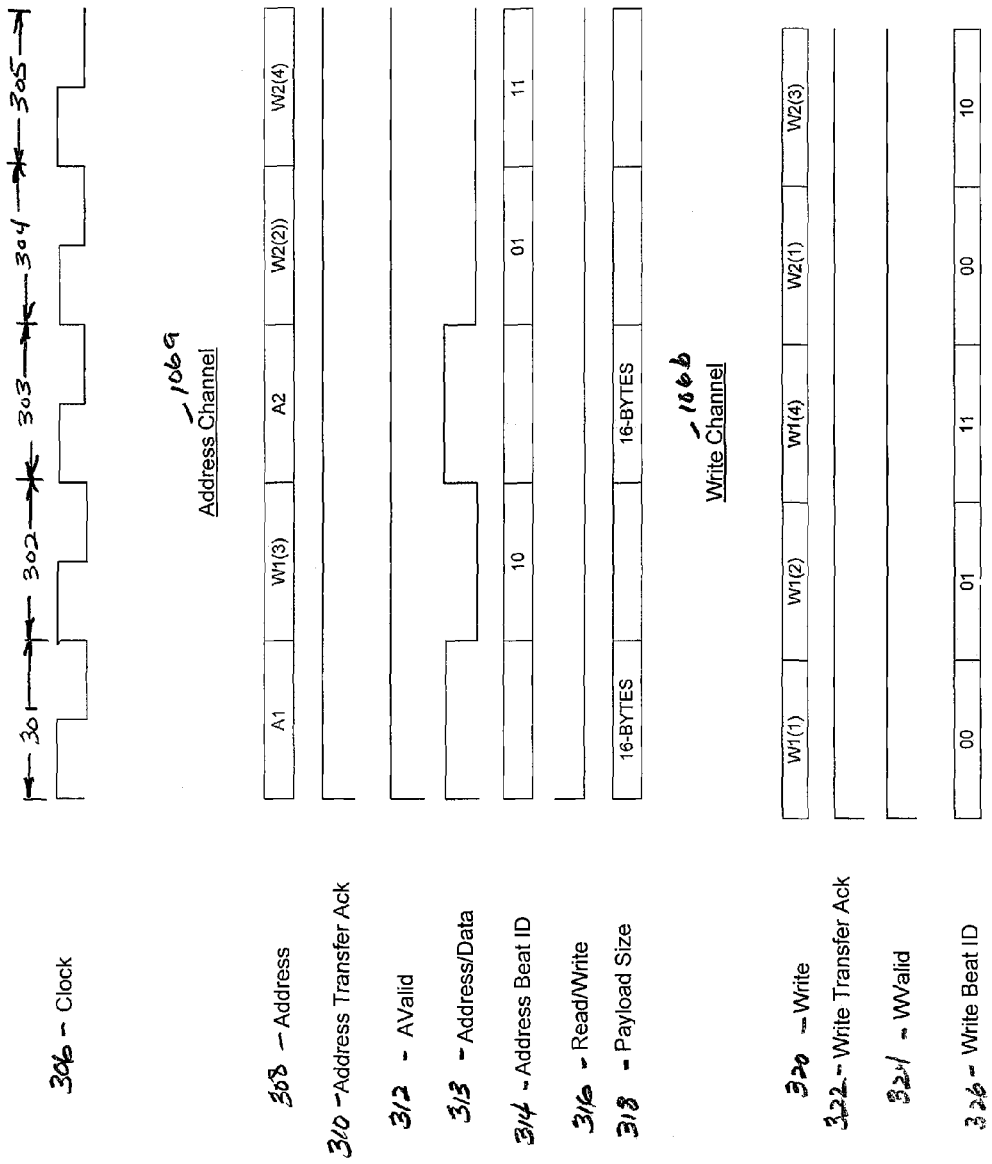
FIG. 3 is a timing diagram showing two write operations over a bus in the processing system of FIG. 1.

FIG. 3 is a timing diagram showing the control signaling for the same two 16-byte write operations described above in connection with FIG. 2. A System Clock 306 may be used to synchronize communications between the sending and receiving devices. The System Clock 306 is shown with five clock cycles, with each clock cycle numbered sequentially.

A write operation may be initiated on the address channel 106a by the sending device during the first clock cycle 301. This write operation is achieved by transmitting the address A1 for the first write operation on the 32-bit Address medium 308. The sending device asserts the A Valid 312 signal to indicate that valid information is being transmitted on the address channel 106a. The sending device 102 also asserts the Address/Data signal 313 to indicate that the information being transmitted on the address channel 106a is an address. The sending device 102 deasserts the Read/Write signal 316 to request a write operation. The Payload Size 318 signal may be used to indicate the size of the payload, which in this case is 16-bytes. The state of the Address Beat ID 314 can be ignored during an address tenure on the address channel 106a.

During the same first clock cycle 301, the sending device uses the Write medium 320 to transmit the first 4-bytes of the first payload W1(1) and sets the Write Beat ID 326 to "00". The sending device also asserts the W Valid signal 324 to indicate that valid information is being transmitted on the write channel 106b.

At the end of the first clock cycle 301, the sending device checks for an asserted Address Transfer Ack signal 310 to confirm the successful delivery of the address A1 over the address channel 106a to the receiving device. The sending device also checks for an asserted Write Transfer Ack signal 322 to confirm the successful delivery of the first 4-bytes of the first payload W1(1) over the write channel 106b to the receiving device.

On the second clock cycle 302, the sending device uses the Write medium 320 to send the second 4-bytes of the first payload W1(2) and sets the Write Beat ID 326 to "01". The sending device also asserts the WValid signal 324 to indicate that valid information is being transmitted on the write channel 106b.

During the same second clock cycle 302, the sending device transmits the third 4-bytes of the first payload W1(3) to the receiving device on the Address medium 308 and sets the Address Beat ID 314 to "10". The sending device also asserts the A Valid 312 signal to indicate that valid information is being transmitted on the address channel 106*a* and deasserts the Address/Data signal 313 to indicate that the information being transmitted on the address channel 106*a* is data. The state of the Read/Write signal 316 and Payload Size 318 may be ignored during a data tenure on the address channel 106*a*. In FIG. 3, the Read/Write signal 316 and the Payload Size 318 remain unchanged, but could be set to any state.

At the end of the second clock cycle 302, the sending device checks for an asserted Write Transfer Ack signal 322 to confirm the successful delivery of the second 4-bytes of the first payload W1(2) over the write channel 106*b* to the receiving device. The sending device also checks for an asserted Address Transfer Ack signal 310 to confirm the successful delivery of the third 4-bytes of the first payload W1(3) over the address channel 106*a* to the receiving device.

On the third clock cycle 303, the sending device uses the Write medium 320 to send the final 4-bytes of the first payload W1(4) and sets the Write Beat ID 326 to "11". The sending device also asserts the WValid signal 324 to indicate that valid information is being transmitted on the write channel 106*b*.

During the same third clock cycle 303 as completing the first write operation, the sending device transmits the address A2 for the second 16-byte write operation on the Address medium 308. The sending device asserts the AValid 312 signal to indicate that valid information is being transmitted on the address channel 106*a*. The sending device 102 also asserts the Address/Data signal 313 to indicate that the information being transmitted on the address channel 106*a* is an address A2. The sending device 102 deasserts the Read/Write signal 316 to request a write operation. The Payload Size 318 signal may be used to indicate the size of the payload, which in this case is 16-bytes. The state of the Address Beat ID 314 can be ignored during an address tenure on the address channel 106*a*.

At the end of the third clock cycle 303, the sending device checks for an asserted Address Transfer Ack signal 310 to confirm the successful delivery of the address A2 over the address channel 106*a* to the receiving device. The sending device also checks for an asserted Write Transfer Ack signal 322 to confirm the successful delivery of the final 4-bytes of the first payload W1(4) over the write channel 106*b* to the receiving device.

The sending device uses the next two clock cycles to send the second payload to the receiving device. On the fourth clock cycle 304, the sending device sends the first 4-bytes of the second payload W2(1) to the receiving device using the Write medium 320 and sets the Write Beat ID 326 to "00". The sending device continues to assert the WValid signal 324 to indicate that valid information is being transmitted on the write channel 106*b*.

During the same fourth clock cycle 304, the sending device transmits the second 4-bytes of the second payload W2(2) on the Address medium 308 and sets the Address Beat ID 314 to "01". The sending device also asserts the AValid 312 signal to indicate that valid information is being transmitted on the address channel 106*a* and deasserts the Address/Data signal 313 to indicate that the information being transmitted on the address channel 106*a* is data. The state of the Read/Write signal 316 and Payload Size 318 may be ignored during a data tenure on the address channel 106*a*.

At the end of the fourth clock cycle 304, the sending device checks for an asserted Write Transfer Ack signal 322 to confirm the successful delivery of the first 4-bytes of the second payload W2(1) over the write channel 106*b* to the receiving device. The sending device also checks for an asserted Address Transfer Ack signal 310 to confirm the successful delivery of the second 4-bytes of the second payload W2(2) over the address channel 106*a* to the receiving device.

On the fifth clock cycle 305, the sending device sends the third 4-bytes of the second payload W2(3) to the receiving device using the Write medium 320 and sets the Write Beat ID 326 to "10". The sending device assert the WValid signal 324 to indicate that valid information is being transmitted on the write channel 106*b*.

During the same fifth clock cycle 305, the sending device transmits the final 4-bytes of the second payload W2(4) on the Address medium 308 and sets the Address Beat ID 314 to "11". The sending device also asserts the AValid 312 signal to indicate that valid information is being transmitted on the address channel 106*a* and deasserts the Address/Data signal 313 to indicate that the information being transmitted on the address channel 106*a* is data. The state of the Read/Write signal 316 and Payload Size 318 may be ignored during a data tenure on the address channel 106*a*.

At the end of the fifth clock cycle 305, the sending device checks for an asserted Write Transfer Ack signal 322 to confirm the successful delivery of the third 4-bytes of the second payload W2(3) over the write channel 106*b* to the receiving device. The sending device also checks for an asserted Address Transfer Ack signal 310 to confirm the successful delivery of the final 4-bytes of the second payload W2(4) over the address channel 106*a* to the receiving device.

A reduction in signaling may be achieved by replacing the Beat ID with an implicit addressing scheme. An example of such an implicit addressing scheme is shown in FIG. 2. In this example, the implicit addressing scheme requires that the next 4-byte sequence of the current payload be transmitted on the earliest clock cycle available, with preference given to the write channel 106*b* over the address channel 106*a*.

Referring to FIG. 2, the earliest clock cycle available to send the first 4-bytes of the first payload W1(1) is the first clock cycle 202 and the write channel 106*b* is available during that clock cycle 202. The earliest clock cycle available to send the second 4-bytes of the first payload W1(2) is the second clock cycle 204, and again the write channel 106*b* is available. The second clock cycle 204 is also available to transmit the third 4-bytes of the first payload W1(3), but the write channel 106*b* is not available. Thus, the third 4-bytes of the first payload W1(3) are transmitted on the address channel 106*a*. The earliest clock cycle available to send the final 4-bytes of the first payload W1(4) is the third clock cycle 206, and again the write channel 106*b* is available.

During the third clock cycle 206, the address A2 for the second write operation is transmitted to the receiving device. However, the write channel 106*a* is not available to send the first 4-bytes of the second payload W2(1) because it is needed during the third clock cycle 206 to send the final 4-bytes of the first payload W1(4). The earliest clock cycle available to send the first 4-bytes of the second payload W2(1) is the fourth clock cycle 208 and the write channel 106*b* is available during that clock cycle 208. The fourth clock cycle 208 is also available to transmit the second 4-bytes of the second payload W2(2), but the write channel 106*b* is not available. Thus, the second 4-bytes of the second payload W2(2) are transmitted on the address channel 106*a*. The earliest clock cycle available to send the final 8-bytes of the second payload W2(3), W2(4) is the fifth clock cycle 210. The third 4-bytes of the second payload W2(3) are transmitted on the write channel 106*b*, i.e., the preferred channel, and the final 4-bytes of the second payload W2(4) are transmitted on the address channel 106*a*.

Figure 4:
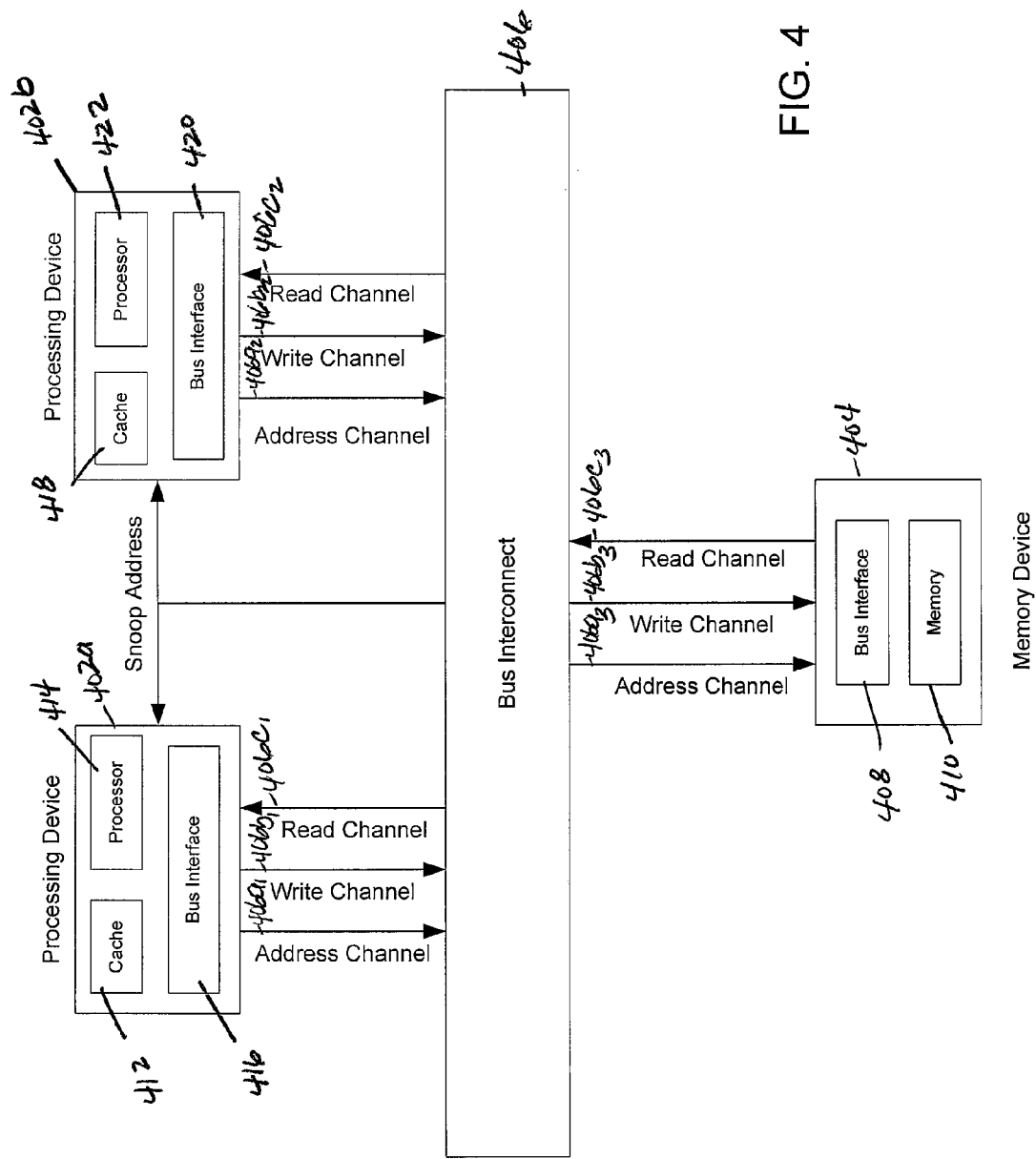
FIG. 4 is a simplified block diagram illustrating a cache coherent processing system with two processing devices in communication with a shared resource through a bus interconnect.

The use of the address channel as a medium for transmitting addresses and data can be employed in various processing environments. By way of example, this technique may be used to reduce the amount of time it takes for a processor to acquire a cache line from another processor in a hardware enforced cache coherent system. This example will be described further with reference to FIG. 4. A cache coherent processing system 400 is shown in FIG. 4 with two processing devices 402a, 402b in communication with a shared resource, such as a memory device 404, through a bus interconnect 406. In this example, the first processing device 402a reads from the memory device 404 by placing an address on its address channel $406a_1$ with the appropriate control signals. The address is forwarded to the memory device 404 by the bus interconnect 406 on the memory's address channel $406a_3$. In response, the bus interface 408 retrieves a block of data from the memory 410 and places it on the memory's read channel $406c_3$. The bus interconnect 406 forwards the data from the memory device 404a to the first processing device 402a over the first processor device's read channel $406c_1$. Once received by the first processing device 402a, the data may be placed in cache 412, modified by a processor 414 and written back to the memory device 404 by the bus interface 416. The write operation may be performed in the same manner as described above in connection with FIGS. 2 and 3.

Cache coherency deals with the situation where the second processing device 402b subsequently attempts to read from the same address. Without a mechanism to ensure cache coherency, the second processing device 402b might receive stale data from the memory device 404 if the data in the cache 412 of the first processing device 402a has been modified but not yet written back to the memory device 404.

A process referred to as "snooping" is commonly used to maintain coherency between cache and memory. Snooping is the process where a processing device, such as the second processing device 402b in this example, issues a read request to a cacheable address in the memory device 404 not present in its own cache 418, which causes the bus interconnect 406 to broadcast the snoop address to the other processing devices in the system prior to forwarding the read request to the memory device 404 for the data. If another processing device, such as the first processing device 402a, has the requested data stored in its cache 412 in a modified state, it will write the modified data back to the memory device 404. Simultaneously, the bus interconnect 406 will send the modified data to the second processing device 402b over the read channel $406c_2$ between. The second processing device 402 will place the modified data in the cache 418 for use by the processor 422.

Figure 5:
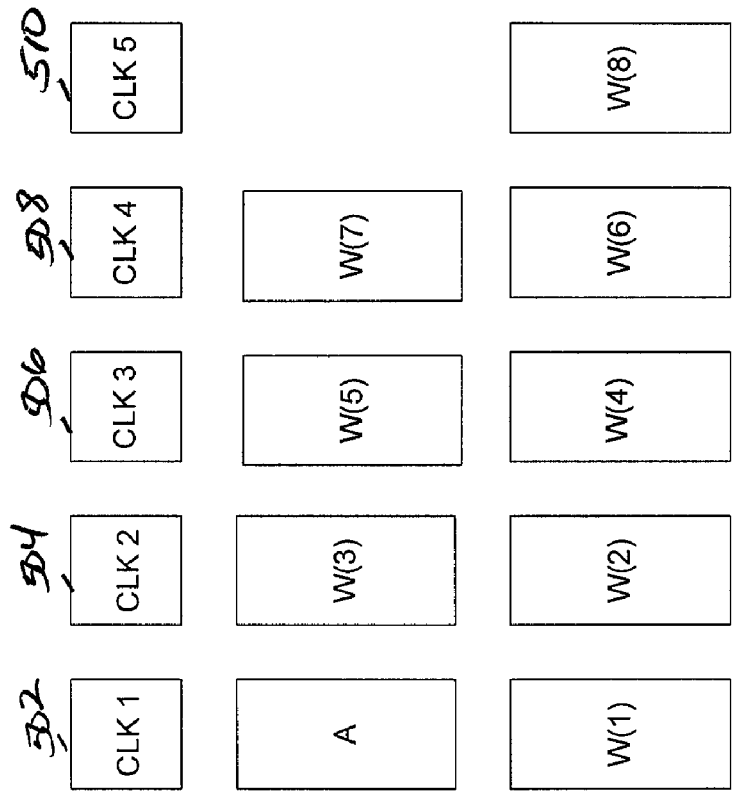
FIG. 5 is an illustration showing the information flowing on the address and write channels between one processing device and the bus interconnect in the cache coherent processing system of FIG. 4.

FIG. 5 is an illustration showing the information flowing on the address and write channels $406a_1$, $406b_1$ between the first processing device 402a and the bus interconnect 406. Referring to FIGS. 4 and 5, the first processing device 402a writes a 32-byte payload from its cache 412 to the memory device 404 in response to a snoop address broadcast by the bus interconnect 406. The write operation is performed by sending the 32-byte payload to the bus interconnect 406 using both the address and write channels $406a_1$, $406b_1$. On the first clock cycle 502, the first processing device 402a sends the snooped address A to the bus interconnect 406 on its address channel $406a_1$ with the appropriate control signals. During the same clock cycle 502, the first 4-bytes of the payload W(1) are sent by the first processing device 402a to the bus interconnect 406 on the write channel $406b_1$.

The remainder of the payload is sent from the first processing device 402a to the bus interconnect 406 over the next four clock cycles. On the second clock cycle 504, the first processing device 402a sends the second 4-bytes of the payload W(2) on the write channel $406b_1$ and third 4-bytes of the payload W(3) on the address channel $406a_1$. The fourth 4-bytes of the payload W(4), the sixth 4-bytes of the payload W(6), and the final 4-bytes of the payload W(8) are sent by the first processing device 402a to the bus interconnect 406 on the write channel $406b_1$ over the next three clock cycles 506, 508 510. The fifth 4-bytes of the payload W(5) and the seventh 4-bytes of the payload W(7) are sent by the first processing device 402a to the bus interconnect 406 on the address channel $406a_1$ over the next two clock cycles 506, 508.

The bus interconnect 406 may send the 32-byte payload to the memory device 404 in a similar manner using both the address and write channels $406a_3$, $406b_3$ to send the payload in 5-clock cycles. The bus interconnect 406 also sends the 32-byte payload to the second processing device 402b on the read channel $406c_2$ in 8-clock cycles in response to the original read request of processing device 402b. The transmission of the 32-byte payload to the memory device 404 and the second processing device 402 can overlap or follow the transmission of the payload between the first processing device 402a and the bus interconnect 406.

An explanation of the control signaling, which was described in detail in connection with FIG. 3, will not be repeated here other than to say that the Beat ID for both the address and write channels $406a_1$, $406b_1$ will need to be expanded to a 3-bit code to handle an 8-beat payload.

Figure 6:
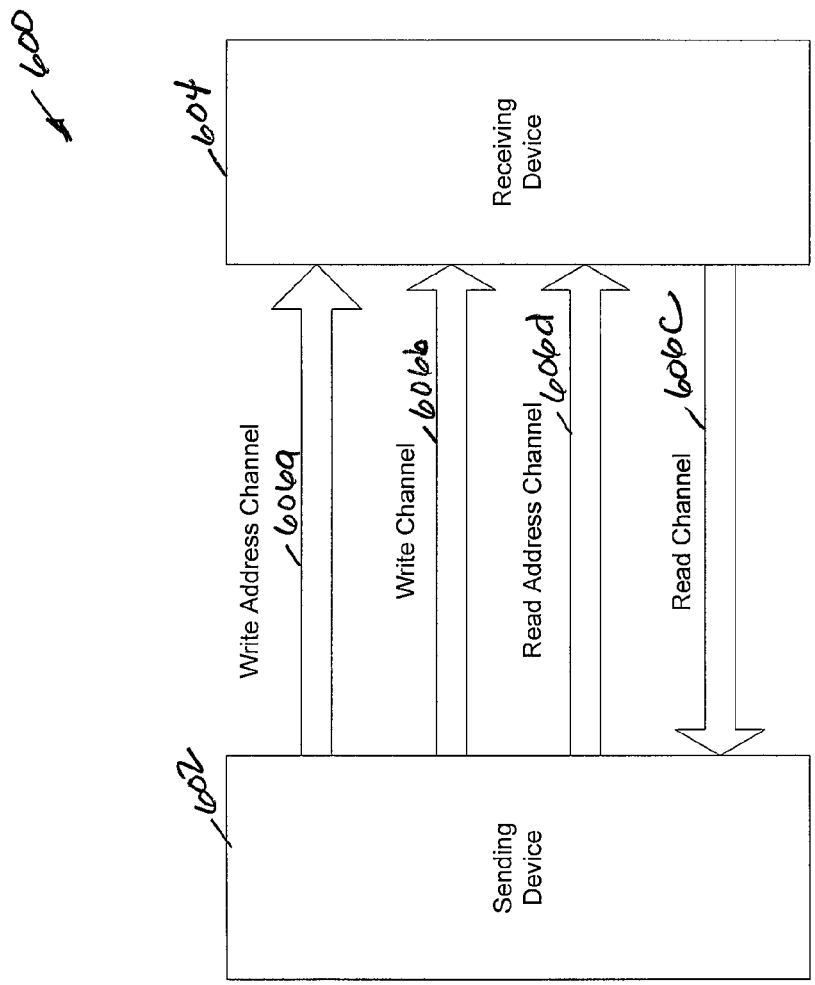
FIG. 6 is a simplified block diagram illustrating an example of two devices in a processing system communicating over a 4-channel bus.

FIG. 6 is a simplified block diagram illustrating an example of two devices in a processing system 600 communicating over a 4-channel bus. A separate and independent address channel is provided for each read and write channel. In this example, each channel is 32-bits wide, but may be any width in practice depending upon the particular application and overall design constraints. A write operation over the 4-channel bus may be performed by sending to the receiving device 604 an address on the write address channel 606a and data on the write address channel 606a, the write channel 606b, and/or the read address channel 606d. A read operation over the 4-channel bus is performed by sending to the receiving device 604 an address on a read address channel 606d. In response, the receiving device 604 sends the payload to the sending device 602 on the read channel 606c.

Figure 7:
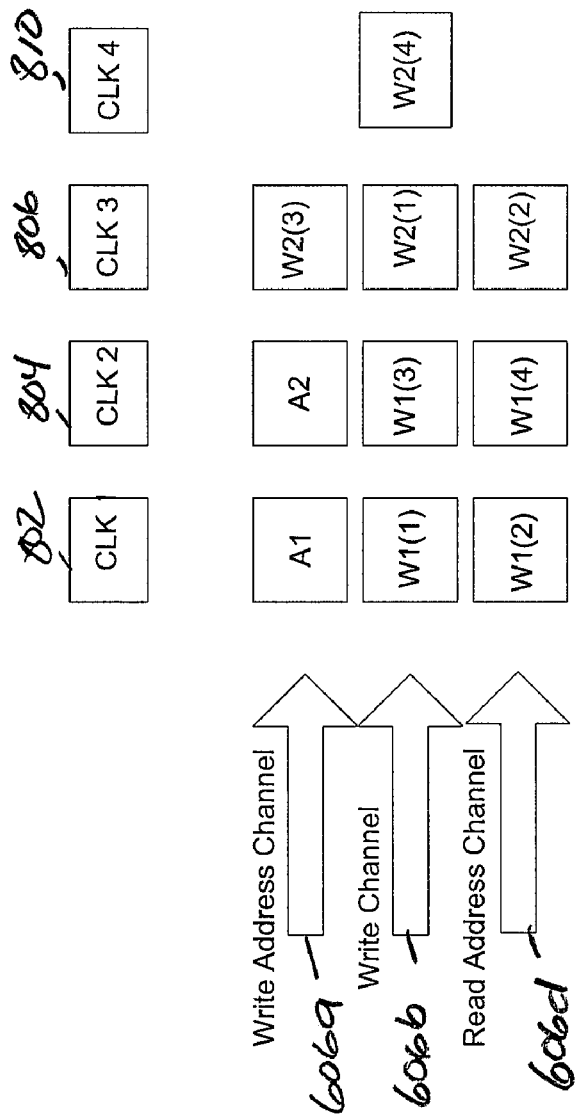
FIG. 7 is an illustration showing information flowing on the address and write channels of a 4-channel bus in the processing system of FIG. 6 with the read and write address channels providing a generic media for addresses and data.

FIG. 7 is an illustration showing the information flowing on the write address, read address, and write channels between the sending device and receiving device over a 4-channel bus. On the first clock cycle 702, the sending device initiates the first 16-byte write operation by sending a 4-byte address A1 to the receiving device on the write address channel 606a with the appropriate control signals. During the same clock cycle 702, the sending device also transmits the first 4-bytes of the first payload W1(1) on the write channel 606b and the second 4-bytes of the same payload W1(2) on the read address channel 606d.

On the second clock cycle 704, the remainder of the first payload is sent by the sending device to the receiving device. More specifically, on the second clock cycle 704 as completing the first write operation, the sending device transmits the third 4-bytes of the first payload W1(3) on the write channel 606b and final 4-bytes of the first payload W1(4) on the read address channel 606d. During the same clock cycle 704, the sending device sends the address A2 for the second 16-byte write operation to the receiving device on the write address channel 606a.

The sending device then uses the next two clock cycles to send the second payload to the receiving device. On the third clock cycle 706, the sending device sends to the receiving device the first 4-bytes of the second payload W2(1) on the write channel 606b, the second 4-bytes of the second payload W2(2) on the read address channel 606d, and the third 4-bytes of the second payload W2(3) on the write address channel 606a. On the next clock cycle 708, the sending device sends the final 4-bytes of the second payload W2(4) on the write channel 606b to the receiving device.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the sending and/or receiving component, or elsewhere. In the alternative, the processor and the storage medium may reside as discrete components in the sending and/or receiving component, or elsewhere.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A processing system, comprising:
a receiving device;
a bus having an address channel, a write channel, and a read channel; and
a sending device configured to send an address to the receiving device on the address channel and to receive read data from the receiving device on the read channel, the sending device being further configured to concurrently send a portion of a payload to the receiving device on the write channel and another portion of the payload to the receiving device on the address channel;
wherein, when sending multiple sequential portions of the payload on the bus concurrently, the sending device is configured to give data ordering preference to the write channel over the address channel by sending a first sequential portion of the multiple sequential portions on the write channel and sending a subsequent sequential portion of the multiple sequential portions on the address channel.

2. The processing system of claim 1,
wherein the portion is a second portion of the payload, wherein the other portion is a third portion of the payload, and wherein the payload further comprises a first portion,
wherein, prior to sending the second and third portions of the payload, the sending device is further configured to concurrently send the first portion of the payload to the receiving device on the write channel and the address to the receiving device on the address channel,
wherein the address includes a first address corresponding to the first portion, and
wherein the first portion, the second portion, and the third portion of the payload are sequential portions of the payload sent to the receiving device.

3. The processing system of claim 1,
wherein the portion is a second portion of the payload, wherein the other portion is a third portion of the payload, and wherein the payload further comprises a first portion,
wherein the sending device is further configured to concurrently send a fourth portion of the payload on the write channel to a first address of the receiving device and a second address to the receiving device on the address channel,
wherein the first, second, third, and fourth portions of the payload are sequential portions of the payload sent to the receiving device.

4. The processing system of claim 1, wherein the sending device comprises a first processing device and the receiving device comprises a bus interconnect, the processing system further comprising a second processing device, the bus interconnect being configured to connect the first and second processing devices to a shared resource, and wherein the first processing device is further configured to send multiple portions of the payload to the bus interconnect in response to a snoop address from the second processing device.

5. The processing system of claim 1, wherein the bus further comprises a second address channel, the sending device being further configured to send the address to the receiving device on the address channel for write operations and to send a read address to the receiving device on the second address channel for read operations, and wherein the sending device is further configured to send an additional portion of the payload to the receiving device on the second address channel.

6. The processing system of claim 5,
wherein the sending device is further configured to concurrently send a second address to the receiving device on the address channel, a third portion of the payload to the receiving device on the write channel, and a fourth portion of the payload to the receiving device on the second address channel,
wherein the third and fourth portions of the payload are sequential portions of the payload sent to the receiving device,
wherein sequential data ordering preference is given to the payload data of the write channel over payload data of the second address channel.

7. The processing system of claim 1, wherein the sending device is further configured to provide a control signal to the receiving device indicating whether the address channel is currently being used to send the address to the receiving device or send a portion of a write payload to the receiving device.

8. The processing system of claim 1, wherein the sending device is further configured to provide a control signal on each of the address channel and the write channel, each of the control signals identifying a respective portion of the payload being sent on its corresponding channel.

9. A processing system, comprising:
a receiving device;
a bus having an address channel, a write channel, and a read channel;
means for sending an address to the receiving device on the address channel;
means for reading data from the receiving device on the read channel; and
means for concurrently sending a portion of a payload from the sending device to the receiving device on the write channel and another portion of the payload from the sending device to the receiving device on the address channel,
wherein, when sending multiple sequential portions of the payload on the bus concurrently, the means for sending gives data ordering preference to the write channel over the address channel by sending a first sequential portion of the multiple sequential portions on the write channel and sending a subsequent sequential portion of the multiple sequential portions on the address channel.

10. A method of communicating between a sending device and a receiving device over a bus, the bus comprising an address channel, a write channel, and a read channel, the method comprising:
sending an address to the receiving device on the address channel;
reading data from the receiving device on the read channel; and
concurrently sending a portion of a payload from the sending device to the receiving device on the write channel and another portion of the payload from the sending device to the receiving device on the address channel,
wherein, when sending multiple sequential portions of the payload on the bus concurrently, data ordering preference is given to the write channel over the address channel by sending a first sequential portion of the multiple sequential portions on the write channel and sending a subsequent sequential portion of the multiple sequential portions on the address channel.

11. The method of claim 10, wherein the portion is a second portion of the payload, wherein the other portion is a third portion of the payload, and wherein the payload further comprises a first portion, the method further comprising:
prior to sending the second and third portions of the payload, concurrently sending the first portion of the payload to the receiving device on the write channel and the address to the receiving device on the address channel,
wherein the address includes a first address corresponding to the first portion, and
wherein the first portion, the second portion, and the third portion of the payload are sequential portions of the payload sent to the receiving device.

12. The method of claim 10, wherein the portion is a second portion of the payload, wherein the other portion is a third portion of the payload, and wherein the payload further comprises a first portion, the method further comprising:
concurrently sending a fourth portion of the payload on the write channel to a first address of the receiving device and a second address to the receiving device on the address channel after sending the first, second, and third portions of the payload,
wherein the first, second, third, and fourth portions of the payload are sequential portions of the payload sent to the receiving device.

13. The method of claim 10, wherein the sending device comprises a first processing device and the receiving device comprises a bus interconnect, the processing system further comprising a second processing device, the bus interconnect being configured to connect the first and second processing devices to a shared resource, and wherein multiple portions of the payload are sent to the bus interconnect in response to a snoop address from the second processing device.

14. The method of claim 10, wherein the bus further comprises a second address channel, the addressing of the receiving device on the address channel being for write operations, the method further comprising addressing the receiving device on the second address channel for read operations, and sending an additional portion of the payload to the receiving device on the second address channel.

15. The method of claim 14, further comprising:
concurrently sending a second address to the receiving device on the address channel, a third portion of the payload to the receiving device on the write channel, and a fourth portion of the payload to the receiving device on the second address channel,
wherein the third and fourth portions of the payload are sequential portions of the payload sent to the receiving device,
wherein sequential data ordering preference is given to payload data of the write channel over payload data of the second address channel.

16. The method of claim 10, further comprising:
providing a control signal to the receiving device indicating whether the address channel is currently being used to address the receiving device or to send a portion of a write payload to the receiving device.

17. The method of claim 14, further comprising:
providing a control signal on each of the address channel, the write channel, and the second address, each of the control signals identifying a respective portion of the payload being sent on its corresponding channel.

18. A slave device, comprising:
a memory; and
a bus interface configured to interface the memory to a bus having an address channel, a write channel, and a read channel, the bus interface being configured to receive an address from a bus mastering device on the address channel and to send read data to the bus mastering device on the read channel, the bus interface being further configured to concurrently receive a portion of a payload from the bus mastering device on the write channel and another portion of the payload from the bus mastering device on the address channel;
wherein, when multiple sequential portions of the payload are received on the bus concurrently, a first sequential portion of the multiple sequential portions is received on the write channel and a subsequent sequential portion of the multiple sequential portions is received on the address channel according to a data ordering preference given to the write channel over the address channel.

19. The slave device of claim 18,
wherein the portion is a second portion of the payload, wherein the other portion is a third portion of the payload, and wherein the payload further comprises a first portion, wherein, prior to receiving the second and third portions, the bus interface is further configured to concurrently receive the first portion of the payload on the write channel and the address on the address channel, wherein the first portion, the second portion, and the third portion of the payload are sequential portions of the payload.

20. The slave device of claim 18, wherein the bus interface further comprises a second address channel, the bus interface being further configured to receive the address on the address channel for write operations and to receive a read address on the second address channel for read operations, and wherein the bus interface is further configured to receive an additional portion of the payload from the bus mastering device on the second address channel.

21. The slave device of claim 20,
wherein the bus interface is further configured to concurrently receive a second address from the bus mastering device on the address channel, a third portion of the payload from the bus mastering device on the write channel, and a fourth portion of the payload from the bus mastering device on the second address channel,
wherein the third and fourth portions of the payload are sequential portions of the payload sent to the bus interface of the slave,
wherein sequential data ordering preference is given to payload data received from the write channel over payload data on the second address channel.

22. The slave device of claim 18, wherein the bus interface is further configured to receive a control signal from the bus mastering device indicating whether the address channel is currently being used to send an address or a portion of a write payload.

23. The slave device of claim 20, wherein the bus interface is further configured to receive a control signal on each of the address channel, the write channel, and the read channel, each of the control signals identifying a respective portion of the payload being sent on its corresponding channel.

24. The processing system of claim 1, wherein the sending device is configured to implicitly address the receiving device, wherein a next sequential portion of the payload is written during an earliest available clock cycle.

25. The processing system of claim 24, wherein each payload is transmitted in its entirety before a next payload is transmitted.

26. The method of claim 10, wherein the sending device is configured to implicitly address the receiving device, wherein a next sequential portion of the payload is written during an earliest available clock cycle.

27. The method of claim 26, wherein each payload is transmitted in its entirety before a next payload is transmitted.

28. The slave device of claim 18, wherein the bus mastering device is configured to implicitly address the memory, wherein a next sequential portion of the payload is received from the bus mastering device during an earliest available clock cycle.

29. The slave device of claim 28, wherein each payload is received in its entirety before a next payload is transmitted.

30. The processing system of claim 1, wherein the sending device is configured to interleave portions of multiple payloads and to generate control signals including payload sequence numbers to identify each of the multiple payloads.

31. The method of claim 10, wherein the sending device is configured to interleave portions of multiple payloads and to generate control signals including payload sequence numbers to identify each of the multiple payloads.

32. The slave device of claim 18, wherein the bus interface is configured to interleave portions of multiple payloads and to generate control signals including payload sequence numbers to identify each of the multiple payloads.

33. A processing system comprising:
a receiving device;
a bus having a write address channel, a write channel, and a read address channel; and
a sending device configured to send an address to the receiving device on the write address channel and to concurrently send a portion of a payload to the receiving device on the write channel and another portion of the payload to the receiving device on the read address channel,
wherein, when sending multiple sequential portions of the payload on the bus concurrently, the sending device is configured to give data ordering preference to the write channel over the read address channel by sending a first sequential portion of the multiple sequential portions on the write channel and sending a subsequent sequential portion of the multiple sequential portions on the read address channel.

34. The processing system of claim 33,
wherein the portion is a first portion of the payload, wherein the other portion is a second portion of the payload, and wherein the payload further comprises a third portion and a fourth portion,
wherein the sending device is further configured to concurrently send the third portion of the payload on the write channel, the fourth portion of the payload on the read address channel, and a second address to the receiving device on the write address channel, the second address corresponding to a second payload,
wherein the first, second, third, and fourth portions of the payload are sequential portions of the payload sent to the receiving device.

35. The processing system of claim 34,
wherein the second payload comprises a first portion of the second payload, a second portion of the second payload, and a third portion of the second payload,
wherein, after sending the first, second, third, and fourth portions of the payload, the sending device is further configured to concurrently send the first portion of the second payload on the write channel, the second portion of the second payload on the read address channel, and the third portion of the second payload on the write address channel,
wherein the first, second, and third portions of the second payload are sequential portions of the second payload sent to the receiving device.

* * * * *